(12) United States Patent
Kühl et al.

(10) Patent No.: US 6,251,321 B1
(45) Date of Patent: Jun. 26, 2001

(54) PROCESS OF MAKING A HOMOGENEOUS FLOOR COVERING

(75) Inventors: Hans-Michael Kühl, Hirschberg; Gerhard Graab, Mannheim; Klaus Heckel, Gorxheimertal, all of (DE)

(73) Assignee: Carl Freudenberg, Weinheim (DE)

( * ) Notice: Subject to any disclaimer, the term of this patent is extended or adjusted under 35 U.S.C. 154(b) by 0 days.

(21) Appl. No.: 09/344,975

(22) Filed: Jun. 28, 1999

(30) Foreign Application Priority Data

Jul. 14, 1998 (DE) .............................................. 198 31 509

(51) Int. Cl.$^7$ ..................................................... B29C 43/22
(52) U.S. Cl. .............................. 264/73; 264/143; 264/162
(58) Field of Search ............................... 264/73, 75, 143, 264/162, 172.19

(56) References Cited

U.S. PATENT DOCUMENTS 4,396,566 * 8/1983 Brinkmann et al. ................... 264/70

FOREIGN PATENT DOCUMENTS 0 046 526 B1    2/1987  (EP) .
0 512 197 A1   11/1992  (EP) .

* cited by examiner

Primary Examiner—Leo B. Tentoni
(74) Attorney, Agent, or Firm—Kenyon & Kenyon

(57) ABSTRACT

A homogeneous floor covering composed of elastomer, varicolored granular particles contains 3 to 20 per cent by weight of a copolymer of ethylene, including at least one comonomer of vinyl esters of saturated carboxylic acids having up to 4 C-atoms in the acid group, or including at least one unsaturated mono- or dicarboxylic acid, or including at least one ester of unsaturated mono- or dicarboxylic acids having up to 8 C-atoms in the alcohol portion. In this context, the ethylene content of the copolymer is 40 to 95% per cent by weight, the rest is comonomer, and the melt-flow index of the copolymer must lie between 0.1 and 50. A corresponding manufacturing process is specified.

6 Claims, No Drawings

PROCESS OF MAKING A HOMOGENEOUS FLOOR COVERING

FIELD OF THE INVENTION

The present invention relates to an elastomer floor covering. In particular, it relates to a homogeneous floor covering of cross-linkable, elastomer material, having a directionless pattern. A manufacturing process is also specified.

DESCRIPTION OF RELATED ART

European Patent A1 0 512 197 describes a floor covering of the species, which is completely free of trapped air. The manufacturing process is characterized in that, using a short screw-type extruding machine including an attached perforated disk, moldings having a size of 1 to 2 mm are continuously produced from two or more varicolored, vulcanizable elastomer materials by knocking off the emerging strands.

These moldings are passed through the gap of a two-roll calender under a constant line pressure, the calender having horizontally arranged rolls capable of being heated and cooled, a homogeneous band being formed, which is vulcanized to form a ready-made floor covering. To keep the line of pressure in the roll nip as narrow as possible, a very low diameter/length ratio of 1:3.5 is preferred.

Using this process, floor coverings having a thickness of approximately 2 mm can only be made in a limited width. In the recommended diameter/length ratio of 1:3.5 for the calender, the width of 1250 mm specified in the citation already requires a roll diameter of 370 mm, given a length of 1300 mm. It has been found that, in the manufacture of a 2 mm thick web, such slim rolls bend away from each other in the middle of their axial extent by up to 1 mm and more. This effect intensifies considerably in response to an increasing roll length, or web width, given a constant roll diameter.

Consequently, the resulting web has a thickness, of over 2.8 mm in its corresponding central surface area, and only the areas near the edges have the desired calibration thickness of 2 mm.

An alternative to this line pressing process is to process the material flat, for example, in a band molding press. European Patent B1 0 046 526 describes such a process, which has the advantage of an exactly equal pressing pressure in all surface areas, and consequently, the possibility of manufacturing webs having a uniform thickness.

In the process, a raw material layer of spread-out thermoplastic particles is continuously compressed flat at 160° C. to 220° C. and welded together, and is subsequently cooled down and pressed off at an unchanging pressure. In this context, the web width is dependent only on the width of the molding press.

If one tries to apply this method—described for thermoplastic materials—to vulcanizable, elastomer materials for floor coverings, webs are produced whose elongation at break, according to DIN 53 504, has values of only 20 to 30%. Such low elongations, however, are inadequate for floor coverings since they must very often be laid on uneven sub-floors and against edge areas, the floor coverings having to adapt to uneven areas and imprecise fits through certain elongation properties so as to avoid destruction.

However, elastomer materials are always to be given preference since, in contrast to thermoplastic materials, they exhibit a resistance to cigarette burns.

SUMMARY OF THE INVENTION

The object of the present invention is to specify a homogeneous floor covering of cross-linkable, elastomer material, having a multicolored, directionless pattern, which in the case of widths of 1 m to 2 m, exhibits only an insignificant change in thickness (maximally 5%) over its entire surface, has a thickness of 1.5 to 3.5 mm, minimum elongation of 60% according to DIN 53 504.

A further object of the present invention, is to specify a continuous manufacturing process, making it possible to produce such a floor covering economically.

The property "homogeneous" is defined for floor coverings according to DIN 16 850: "Homogeneous elastomer coverings, composed of a layer or a plurality of layers of equal composition. They have a multicolored, continuous pattern, or a continuous, uniform color."

This objective is achieved according to the present invention by using a homogeneous floor covering of cross-linkable, elastomer material, having a multicolored, directionless pattern, and having the properties required by the object of the invention, the floor covering, with respect to its total weight, containing 3 to 20 per cent by weight of a copolymer of ethylene including at least one comonomer belonging to the group of vinyl esters of saturated carboxylic acids having up to 4 C-atoms in the acid group, unsaturated mono- or dicarboxylic acids, esters of unsaturated mono- or dicarboxylic acids having up to 8 C-atoms in the alcohol portion, α-olefins having 4 to 10 C-atoms.

In this context, the ethylene content of the copolymer must be 40 to 95 per cent by weight, the comonomer content 5 to 60 per cent by weight. The melt-flow index of the copolymer must lie between 0.1 and 50.

DETAILED DESCRIPTION OF THE INVENTION

Copolymer proportions of 3 to 10 per cent by weight turned out to be particularly advantageous, compared to ones having higher copolymer proportions, since then, due to the slight adhesive quality, the mixture can be processed more favorably on the rolls. In addition, the properties of the ready-made floor covering are not substantially affected; copolymer proportions higher than 10 per cent by weight can cause, for example, a worsening of the fire resistance.

The floor covering can be essentially in two embodiments: In the one case, the granular particles forming it have a single color in and of themselves; in the other case, they have a colored pattern in and of themselves. The visual effect of the surface is a little quieter in the latter variant while the alternative conveys a livelier picture of the surface.

The manufacture of the floor covering according to the present invention is carried out in a generally known manner in that, first of all, granular material particles are produced from unvulcanized elastomer material, the particles differing from each other in color, and also being able to have non-homogeneous colors in and of themselves. To this end, corresponding, varicolored rubber mixtures are produced independently of each other, formed into strands using extruding machines, and subsequently granulated into grain sizes of up to 3.0 mm.

Then, analogously to European Patent B1 0 046 526, at least two granular materials differing in color are spread on a band-shaped, horizontally moving carrier. Such carriers can be composed of release paper, steel band, or polytetrafluoroethylene band, and must never adhere to the particles.

The compressing and vulcanization are carried out in a band molding press appropriate for the width of the floor covering to be produced, at 160 to 180° C. and at a pressure of 3 to 30 N/mm². Subsequently, the reverse side of the resulting web is polished for the sake of improving the gluing capability.

Essential to the present invention of this process is that, with respect to the total weight of the materials to be processed, 3 to 20 per cent by weight of a copolymer of ethylene including at least one comonomer are mixed with the unvulcanized rubber mixtures prior to their processing. Suitable comonomers include

- vinyl esters of saturated carboxylic acids having up to 4 C-atoms in the acid group,
- unsaturated mono- or dicarboxylic acids
- esters of unsaturated mono- or dicarboxylic acids having up to 8 C-atoms in the alcohol portion,
- α-olefins having 4 to 10 C-atoms.

The ethylene content of the copolymer is 40 to 95 per cent by weight, the rest is comonomer, and the melt-flow index of the copolymer must lie between 0.1 and 50.

Using copolymer proportions of 3 to 10 per cent by weight reduces the adhesive quality of the material during processing, and improves the fire resistance and mechanical resilience of the finished product.

With regard to the alternatives of creating the floor covering from granular material particles which have either a single color in and of themselves or a multicolored pattern in and of themselves, corresponding procedures are known to a worker skilled in the art. The making of multicolored patterns is described, for example, in European Patent A1 0 512 197. During the extrusion of the material to be reduced to granular particles, care must be taken that the varicolored strips of vulcanized rubber are not subjected to an intermixing of colors.

A suitable device for this is, for example, a conventional short screw-type extruding machine, which is operated at 60 to 100° C. In a specific embodiment, the resulting strands pass through a perforated disk having bores of a diameter of 3 to 5 mm; the strands are knocked off every 1 to 2 mm. Alternatively, for this purpose, the plasticized mass is permitted to emerge from a slot nozzle of an extrusion head, and the cooled mass is granulated using cutting mills.

The quantity of copolymer contained in the floor covering according to the present invention, i.e., mixed with the elastomer mass prior to processing, is usefully given a lower limit of 3 per cent by weight, since smaller proportions cannot have any essential effect on the extensibility [elasticity] any more. The upper limit is 20 per cent by weight since higher values would change the Shore hardness of the elastomer material too much; the Shore hardness of the ready-made floor covering should as far as possible be the same as that of the starting mixture.

EXAMPLE

Using advantageous embodiments, the achievement of the object according to the present invention is explained by the following examples on the basis of comparable measuring results. All examples start from unvulcanized elastomer material composed as follows:

| | |
|---|---|
| Styrene-butadiene rubber having a styrene content of 23 per cent by weight | 100 parts |
| Styrene-butadiene copolymer having a styrene content of 85 per cent by weight | 20 parts |

-continued

| | |
|---|---|
| Precipitated silicic acid | 40 parts |
| Kaolin | 70 parts |
| Precipitated chalk | 30 parts |
| Coumarone-indene resin | 15 parts |
| Zinc oxide | 5 parts |
| Stearic acid | 1.5 parts |
| Sulphuric acid | 2.5 parts |
| Polyethylene glycol | 3 parts |
| Cyclohexyl benzothiazole sulphene amide | 2.7 parts |
| Tetramethylthiuramdisulfide | 0.5 parts |
| Pigments | as desired |

The particle-size distribution of the granular material is

| | |
|---|---|
| >2.5 mm | 1% |
| >22.0 mm | 33% |
| >21.4 mm | 55% |
| >1.0 mm | 25% |
| >0.71 mm | 6% |

The starting mixture has the following parameters:

TABLE 1

| Starting mixture | | | |
|---|---|---|---|
| As roll compound | | As spread layer | |
| Elongation % | Shore Hardness | Elongation % | Shore Hardness |
| 120 | 92 | 30 | 92 |

Table 1 reveals how the above characterized elastomer granular material, after the processing in a two-roll calender according to the related art, has an excellent elongation of 120%, while the same material passing through a band molding press as a spread layer has an elongation of only 30%, which is inadequate to meet the technical requirements for laying floor coverings.

Table 2 specifies the variants of processing the starting mixture via a band molding press. Here, as in Table 1, the following parameters apply:

| | |
|---|---|
| Width of the band molding press | 1500 mm |
| Width of the floor covering to be produced | 1300 mm |
| Pressing pressure | 30 N/mm² |
| Pressing temperature | 180° C. |
| Vulcanization time | 4 min |

As Table 2 clearly reveals, different quantities of a copolymer of ethylene including at least one comonomer (1st column) were added to the mixture. In the following columns of Table 2, the comonomer contents are assigned to these copolymer quantities.

It turns out that the copolymers composed and added according to the present invention produce minimum elongations of 60% according to DIN 53 504 in the floor covering, while the Shore hardnesses remain nearly unchanged with respect to the starting mixture.

TABLE 2

| Copolymer addition in kg | 18% VA Elong. % | 18% VA Shore Hardness | EVA 28% VA Elong. % | EVA 28% VA Shore Hardness | 50% VA Elong. % | 50% VA Shore Hardness | EEA 18% EA Elong. % | EEA 18% EA Shore Hardness | E-octene 14% octene Elong. % | E-octene 14% octene Shore Hardness |
|---|---|---|---|---|---|---|---|---|---|---|
| 10 | 35 | 93 | 40 | 92 | 60 | 91 | — | — | — | — |
| 15 | — | — | 40 | 92 | — | — | — | — | — | — |
| 20 | 55 | 92 | 70 | 91 | 160 | 89 | 45 | 92 | 40 | 92 |
| 30 | 70 | 91 | 90 | 90 | — | — | 60 | 91 | 60 | 90 |

As Table 2 clearly reveals, different quantities of a copolymer of ethylene including at least one comonomer (1st column) were added to the mixture. In the following columns of Table 2, the comonomer contents are assigned to these copolymer quantities.

It turns out that the copolymers composed and added according to the present invention produce minimum elongations of 60% according to DIN 53 504 in the floor covering, while the Shore hardnesses remain nearly unchanged with respect to the starting mixture.

When using copolymers including vinyl acetate as comonomer, the rule applies that low vinyl acetate contents require a greater quantity of copolymer to be added to the mixture (over 20 kg, Table 2). Adding these increased quantities, however, does not result in a noticeable reduction of the Shore-A hardness of the product. Nor is the mechanical resilience negatively affected in the process.

However, if the vinyl acetate content in the copolymer is increased to, for example, 28 per cent by weight, the desired tensile strength is already reached at a copolymer addition of 20 kg, as shown in Table 2. In the process, the Shore-A hardness is not disadvantageously reduced.

In the case of even higher vinyl acetate contents (50 per cent by weight), a marked softening of the elastomer mixture can be detected even when small quantities of copolymer (10 kg) are added.

Copolymers behave similarly in conjunction with other comonomers; examples are an ethylene-ethyl acrylate copolymer having an ethyl acrylate content of 18 per cent by weight as well as an ethylene-octene copolymer having an octene content of 14 per cent by weight. Both copolymers can be obtained on the market. In the case of the comparatively low comonomer proportions, copolymer additions of over 20 kg are necessary to reach the desired minimum elongation. The achieved Shore-A hardnesses, however, lie within the range which can still be tolerated, but at its margin.

What is claimed is:

1. A process for manufacturing a homogeneous floor covering of cross-linkable, elastomer material, having a multicolored, directionless pattern a thickness of 1.5 to 3.5 mm and a width of 1 to 2 m, comprising the steps of:

producing granular particles existing in at least two colors which differ from each other, from correspondingly varicolored rubber mixtures produced independently of each other, which are formed into strands using extruding machines, and subsequently granulated into grain sizes of up to 3.0 mm;

spreading the granular particles on a band-shaped, horizontally moving carrier, the compression and vulcanization in a band molding press appropriate for the width of the floor covering to be produced, at 160 to 180° C. and at a pressure of 3 to 30 N/mm$^2$ to form a web, and polishing the back side surface of the resulting web, wherein, with respect to the total weight of all materials to be processed, 3 to 20 per cent by weight of a copolymer of ethylene including at least one comonomer, are mixed with the unvulcanized rubber mixtures prior to their processing, and wherein the comonomer is selected from the group consisting of vinyl esters of saturated carboxylic acids having up to 4 C-atoms in the acid group, unsaturated mono or dicarboxylic acids, esters of unsaturated mono- or dicarboxylic acids having up to 8 C-atoms in the alcohol portion, and α-olefins having 4 to 10 C-atoms, the ethylene content of the copolymer being 40 to 95% per cent by weight, the comonomer content 5 to 60 per cent by weight, and the melt-flow index of the copolymer lying between 0.1 and 50.

2. The process according to claim 1, wherein the weight per cent of copolymer is from 3 to 10.

3. The process according to claim 1, wherein the granular particles which exist in at least two different colors each has a single color.

4. The process according to claim 2, wherein the granular particles which exist in at least two different colors each has a single color.

5. The process according to claim 1, wherein granular particles having a colored pattern in and of themselves are produced and used.

6. The process according to claim 2, wherein granular particles having a colored pattern in and of themselves are produced and used.

* * * * *